UnitedStates Patent Office 3,482,383
Patented Dec. 9, 1969

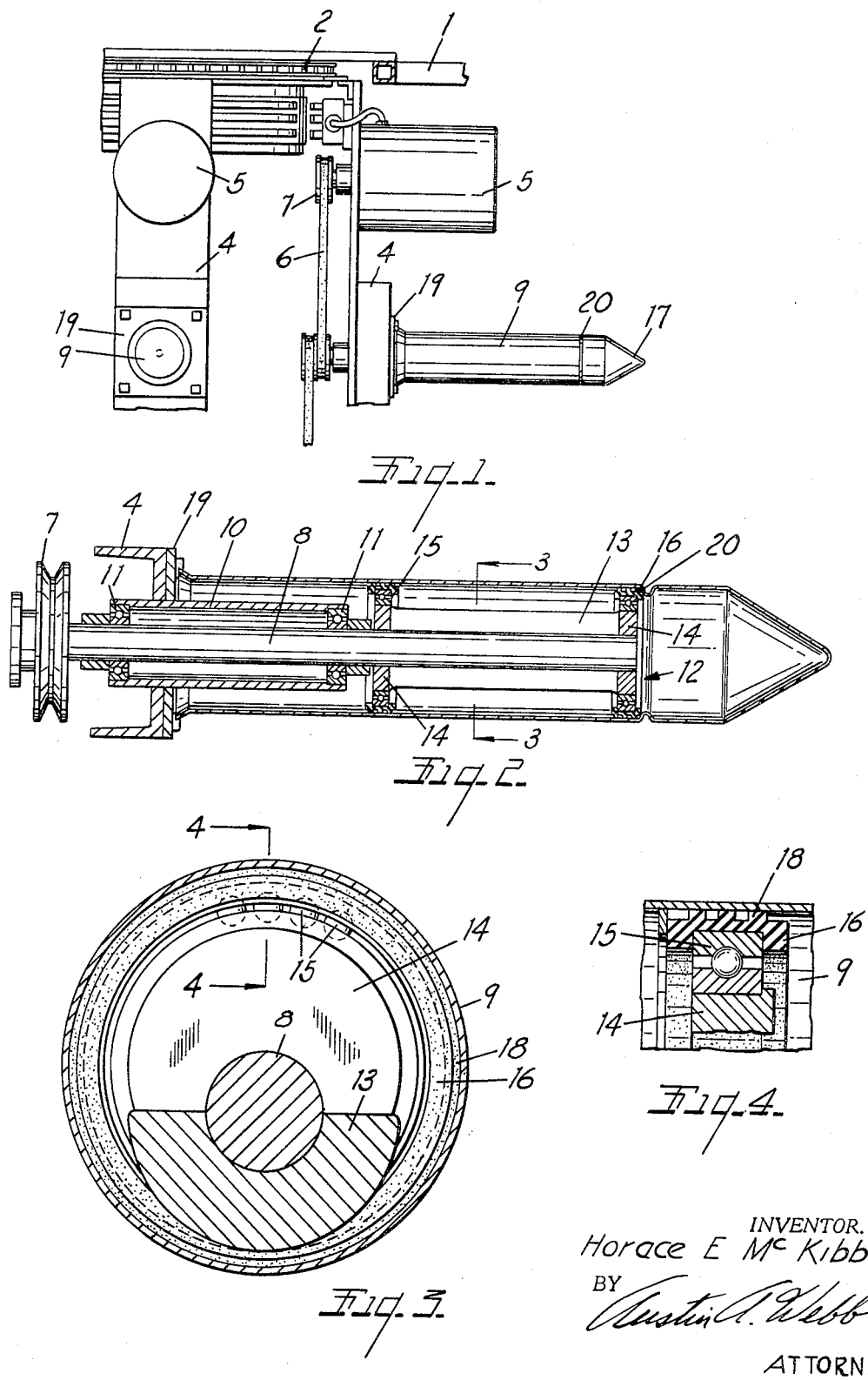

3,482,383
VIBRATING CONTACT ELEMENT FOR PLANT SHAKING HARVESTING MACHINES
Horace E. McKibben, Grand Junction, Mich., assignor to Blueberry Equipment, Inc., South Haven, Mich.
Filed Jan. 8, 1968, Ser. No. 696,198
Int. Cl. A01g 19/00
U.S. Cl. 56—330        7 Claims

ABSTRACT OF THE DISCLOSURE

A driven shaft projecting from a support, a counterweight with circular end members secured at spaced points along the shaft with the shaft eccentric to the circles of the end members, bearings mounted around the end members, deformable rings mounted on the outer parts of the bearings and a tubular cylindrical contact member having a closed pointed end and positioned telescopically around the shaft in frictional supported engagement with the peripheries of the rings, the open end of the finger projecting telescopically around part of the support for the shaft.

RATED APPLICATIONS

The vibratory contact member of this invention is an improved form of the similar contact member disclosed in the copending application of Horace E. McKibben and Paul F. Jones, Ser. No. 503,041, filed Oct. 23, 1965, and now Patent 3,396,521.

OUTLINE OF INVENTION

The invention provides a vibratory contact element for shaking bushes or vines which is simple and inexpensive, long lasting with its moving parts protected from wear, and in which the work contacting part has an orbital, counterbalanced, motion, and is capable of rotation about its axis for freer motion relative to the parts of the bush which it contacts.

DESCRIPTION

The drawings of which there is one sheet illustrate a preferred form of the contact element of the invention.

FIGURE 1 is a fragmentary elevational view, partially in section of a vibratory harvesting machine for row crops such as that disclosed in the related application identified above.

FIGURE 2 is a longitudinal cross sectional view through the contact elment taken along the plane of line 2—2 in FIGURE 1.

FIGURE 3 is a transverse cross sectional view taken along the plane of the line 3—3 in FIGURE 2.

FIGURE 4 is a cross sectional view along the line 4—4 in FIGURE 3.

The vibratory harvesting machine, portions of which are illustrated in FIGURE 1, includes supporting frame members 1 which carry upper and lower conveyor chains one of which is shown at 2. A series of elongated upright carrier bars 4 extend between the chains at intervals and travel around the circuit on the chains. Each carrier bar has a motor 5 secured to its upper end and connected as by the belt 6 to a pulley 7 on a drive shaft 8. The drive shaft is connected as will be described to orbit the tubular contacting member or finger 9 of the invention.

With reference to FIGURE 2 it will be seen that the upright carriers 4 are channel shaped bars with tubular cylindrical bearing supports 10 secured thereto and projecting outwardly therefrom. Bearings 11 support the shaft 8 which projects outwardly a substantial distance beyond the end of the tube. Secured nonrotatably to the shaft 8 as by press fit is a counterweight mounting member indicated generally by the numeral 12 and including an elongated counterweight portion 13 with integrally formed circular end members 14. The shaft 8 is received eccentrically in the circular end members 14.

Mounted around each of the end members 14 is a bearing 15 and each bearing has a cushioning ring 16 of deformable material such as rubber snapped over the outer rotating parts of the bearings. The orbiting contact finger 9 is a lightweight cylindrical metal tube having its outer end rolled into a closed cone as at 17. The cylindrical sides of the tube 9 have frictional driving engagement with ribs 18 formed around the exterior of the cushion rings 16. The inner or left end of the tubular contact members project into closely spaced relation to the surface of a mounting plate 19 by which the bearing support 10 is secured to the upright carrier 4.

Small indentations 20 formed in the side of the tubular contact member form limit stops for the cushion ring on the outer end of the counterweight member 12 to locate the contact member in the desired position axially of the counterweight and the drive shaft 8.

It will be apparent that the tubular contact member or finger 9 will be driven in an orbital path by rotation of the shaft 8 while the counterweight portion 13 balances the weight of the other parts of the finger. The finger 9 may rotate about the bearings 15 and this prevents or limits abrasion of the bush or plant with which the shaker element is in contact at any given time. The extension of the tubular contact member 9 to closely adjacent the upright 4 protects the bearing support 10 and the shaft bearings 11 against entry of foreign material from the bushes while supporting the orbiting portion of the shaker member well toward its free end. This increases the life of the bearings 11 and reduces maintenance of the machine generally. The parts are simple and easily manufactured and assembled thus reducing the cost of the machine.

In addition to being able to roll about the axis of the bearing 15 as it is moved rapidly in its orbital vibrating motion, the contacting finger or sleeve 9 is capable of limited movement, both radially and axially, by yielding of the ribs 18. This further reduces damage to the bushes being shaken, should the finger tend to wedge between the branches. The interval, and distance, of such yielding motion permits the orbital, and advancing motion of the finger to shift to or through a position that will release or loosen the wedging or jambing engagement so that the finger advances with the machine without damage to the bush.

What is claimed as new is:

1. A branch or bush engaging member for a shaker type harvesting machine for row crops comprising
    an elongated support on said machine having a rotatable shaft projecting therefrom, and means on the machine connected to rotate the shaft,
    a pair of circular disc members connected in like eccentric positions to said shaft, and in spaced relation along the shaft adjacent its outer end,
    bearings having peripheral parts relatively rotatably mounted around said disc members,
    a counterweight connected to said disc members in balancing eccentric relation to the eccentricity of the disc members relative to the shaft, and
    a hollow cylindrical work engaging member mounted in telescoping relation and driven engagement around said peripheral parts of said bearings.

2. A branch or bush engaging member as defined in claim 1 in which there are cushion rings of yieldable material positioned around the peripheral parts of said bearings and frictionally engaged with the inside of said work engaging member.

3. A branch or bush engaging member as defined in claim 2 in which said cushion rings have axially spaced, radially projecting ribs on their outer sides.

4. A branch or bush engaging member as defined in claim 1 in which said support is a tube projecting outwardly from said machine, with bearings in the ends of the tube supporting said shaft, said work engaging member extending inwardly from said disc members in telescopic relation around the outer end of said support.

5. A branch or bush engaging member as defined in claim 1 in which said disc members and said counterweight are an integral part.

6. A branch or bush engaging member as defined in claim 4 in which said disc member and said counterweight are an integral part.

7. A branch or bush engaging member as defined in claim 2 in which said disc member and said counterweight are an integral part.

References Cited

UNITED STATES PATENTS

| | | | |
|---|---|---|---|
| 3,184,908 | 5/1965 | Rust | 56—330 |
| 3,245,211 | 4/1966 | Weygandt et al. | 56—330 |
| 3,255,578 | 6/1966 | Pertics | 56—330 |
| 3,276,194 | 10/1966 | Mohn et al. | 56—330 |
| 3,325,984 | 6/1967 | Christie | 56—330 |

RUSSELL R. KINSEY, Primary Examiner